United States Patent

Doutt

[15] 3,678,809
[45] July 25, 1972

[54] VENTED PISTON BEARING FOR HYDRAULIC PISTON AND CYLINDER ASSEMBLIES

[72] Inventor: Kingsley A. Doutt, Alpena, Mich.
[73] Assignee: Scovill Manufacturing Company, Waterbury, Conn.
[22] Filed: Feb. 16, 1970
[21] Appl. No.: 11,663

[52] U.S. Cl. ..................................92/86, 92/244, 92/249, 277/29, 277/71
[51] Int. Cl. .........................................F01b 31/00, F16j 9/00
[58] Field of Search......................92/86, 240, 242, 243, 244, 92/248, 249, 250, 251, 252, 253; 277/29, 70, 71, 78, 79

[56] References Cited

UNITED STATES PATENTS

| 1,828,874 | 10/1931 | Myers | 92/86 |
| 2,072,623 | 3/1937 | Illmer | 277/29 |
| 2,318,757 | 5/1943 | Christenson | 277/212 |
| 2,836,443 | 5/1958 | Farmer | 92/252 X |
| 2,876,025 | 3/1959 | Orldff et al. | 277/29 |
| 2,988,148 | 6/1961 | Conrad et al. | 277/70 |
| 2,914,368 | 11/1959 | Farmer et al. | 92/184 |
| 2,962,330 | 11/1960 | Kohl | 92/253 X |
| 3,397,893 | 8/1968 | Kampert | 92/184 X |

Primary Examiner—Martin P. Schwadron
Assistant Examiner—Irwin C. Cohen
Attorney—Webster B. Harpman

[57] ABSTRACT

A vented piston bearing for hydraulic piston and cylinder assemblies wherein the piston bearings comprise annular members carried on the pistons and engageable with the cylinder wall. The piston bearing is provided with a plurality of transverse openings therein extending to the areas in which the piston seals are located and the piston bearing is provided with a plurality of radially positioned vent passageways communicating with the transverse openings. Hydraulic fluid passing the piston seals is thereby vented through the piston bearing rather than extruding the piston seals from their normal locations.

6 Claims, 3 Drawing Figures

PATENTED JUL 25 1972　　　　　　　　　3,678,809

INVENTOR.
KINGSLEY A. DOUTT
BY
W. B. Harpman
ATTORNEY 3,678,809

VENTED PISTON BEARING FOR HYDRAULIC PISTON AND CYLINDER ASSEMBLIES

BACKGROUND OF THE INVENTION

1. Field of the Invention

This invention relates to hydraulic piston and cylinder assemblies of both the high and low pressure types and wherein seals are carried on the pistons for sealing engagement with the cylinders.

2. Description of the Prior Art

Prior structures of this type have disclosed only pistons movable in cylinders and provided with resilient sealing members positioned annularly about said pistons for sealing engagement with the inner walls of said cylinders. Such seals are positioned in annular configurations formed in the pistons and hydraulic pressure frequently enters the annular configurations and causes the extrusion of the seals therefrom with the resulting loss of sealing effect of the seals thus affected.

This invention eliminates such extruding action as hydraulic fluid under pressure entering the annular configuration of the piston is vented through the piston bearing to the periphery of the piston bearing thereby avoiding a build up of pressure under the piston seal and the resultant extrusion of the piston seal.

SUMMARY OF THE INVENTION

A vented piston bearing positioned in an annular groove in a piston in a hydraulic piston and cylinder assembly and having vent passages formed therein some transversely thereof and some radially thereof and intercommunicating with one another so as to vent hydraulic fluid from positions adjacent the inner portions of the piston bearing to the outer periphery thereof.

DESCRIPTION OF THE PREFERRED EMBODIMENT

Figure 1:
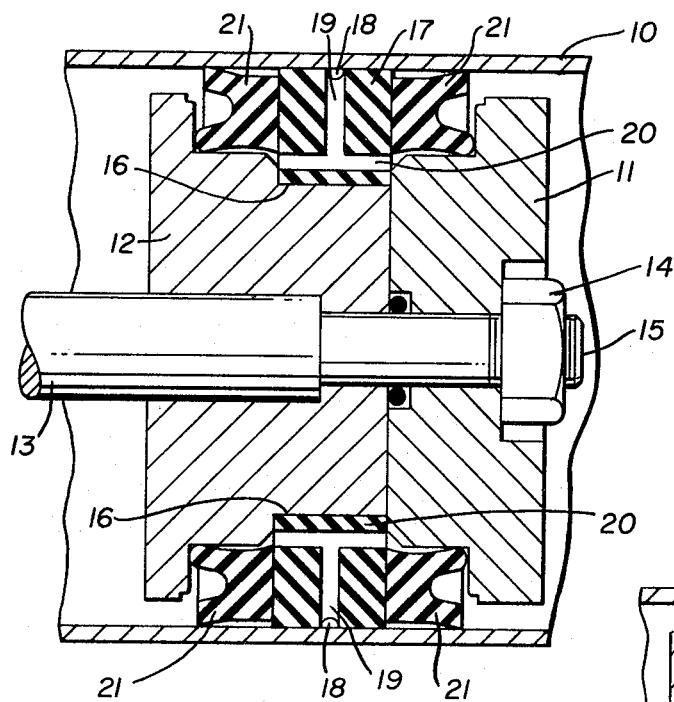
FIG. 1 is a cross sectional elevation with parts broken away illustrating a portion of a hydraulic cylinder and piston assembly with a vented piston bearing in position on said piston.

By referring to the drawings and FIG. 1 in particular, it will be seen that a hydraulic cylinder 10 disclosed with a piston positioned therein for movement axially thereof. The piston comprises a blind end follower 11 and a piston rod end follower 12 as customary in the art and a piston rod 13 is arranged to secure the parts 11 and 12 to one another where they are held by a nut 14 engaged on a threaded extension 15 of the piston rod 13.

The middle peripheral area of the piston has an annular groove 16 thereabout in which a vented piston bearing 17 is located. The piston bearing 17 has its peripheral annular surface in engagement with the inner surface of the hydraulic cylinder 10. A shallow annular groove 18 is formed in the outer periphery of the vented piston bearing 17 and a plurality of circumferentially spaced radially extending vent passageways 19 lead inwardly therefrom each communicating with a transverse secondary vent passageway 20.

Those skilled in the art will observe that a pair of annular piston seals 21 are positioned, one on either side of the vented piston bearing 17 and in annular channels formed in the piston adjacent the piston bearing 17 and that they are of a configuration to effectively seal the piston with respect to the cylinder 10.

The innermost portions of the channels in the piston in which annular piston seals 21 are located are in communication with the plurality of secondary vent passageways 20 so that hydraulic fluid working its way from either side of the piston downwardly and in under the annular piston seals 21 will vent through the secondary vent passages 20 and the vent passages 19 to the peripheral groove 18 of the vented piston bearing 17 and the heretofore common extrusion of the annular piston seals 21 by hydraulic pressure will be completely eliminated by the venting action.

It will occur to those skilled in the art that under normal operating conditions the sealing action of the annular piston seals 21 will prevent passage of hydraulic fluid into the vent passages in the vented piston bearing 17 but that such venting will occur when pressure builds up or begins to build up in the channels in which the annular piston seals 21 are located.

Figure 2:
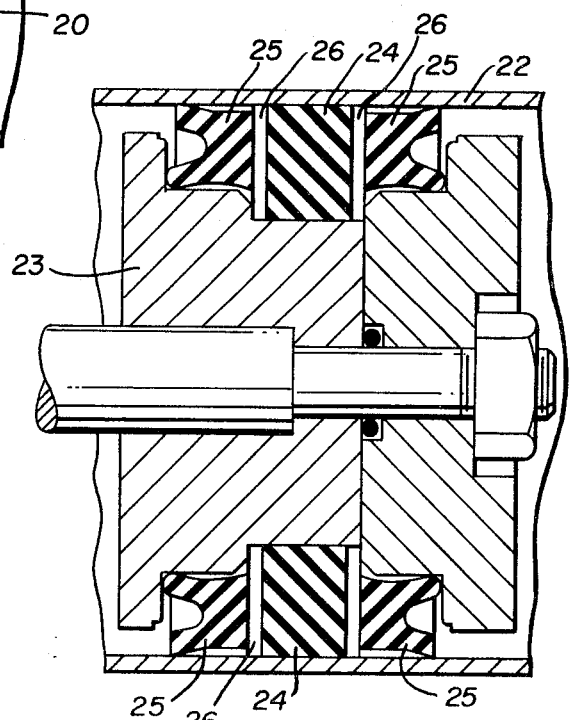
FIG. 2 is a cross sectional elevation with parts broken away illustrating a hydraulic piston and cylinder assembly with a modified form of vented piston bearing on said piston.

It will occur to those skilled in the art that modifications in the venting construction disclosed in FIG. 1 of the drawings and hereinbefore described may be made without departing from the spirit of the invention and by referring to FIG. 2 of the drawings one such modification may be seen. In FIG. 2 a hydraulic piston and cylinder assembly is shown with parts broken away as comprising a cylinder 22 having a two-part piston 23 therein which is grooved to receive a piston bearing 24 and a pair of oppositely disposed annular piston seals 25 on the opposite sides thereof. A plurality of radially extending circumferentially spaced shallow grooves 26 are formed in the outer sides of the piston bearing 24 and thereby communicate with the innermost portions of the channels in which the annular piston seals 25 are located. Hydraulic fluid under pressure moving in under the annular piston seals 25 will be vented through the shallow grooves 26 to the periphery of the piston bearing 24 thus avoiding extruding the seals 25 from their desired position in the hydraulic piston and cylinder assembly.

Figure 3:
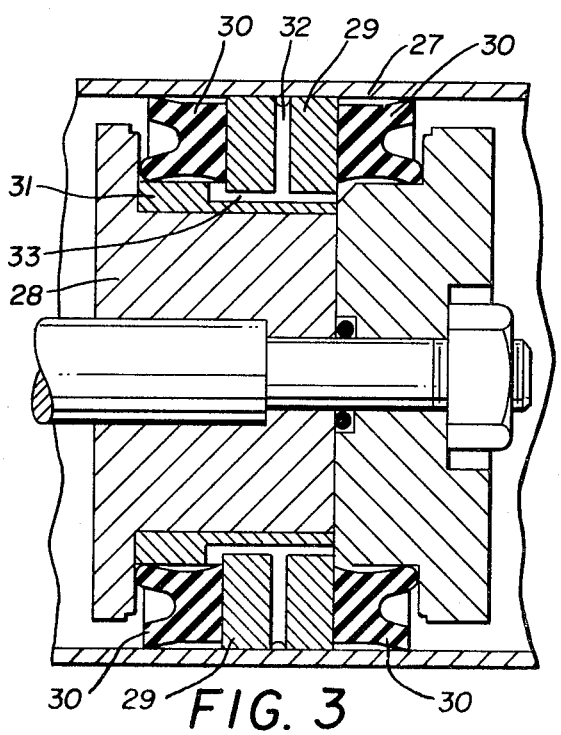
FIG. 3 is a cross sectional elevation with parts broken away illustrating a hydraulic piston and cylinder assembly and a further modification of a piston bearing in position on the piston thereof.

Still another modification of the construction is possible and by referring to FIG. 3 of the drawings it will be seen that a hydraulic piston and cylinder assembly is disclosed with parts broken away and wherein a hydraulic cylinder 27 has a piston 28 therein and a piston bearing 29 is mounted thereon.

Annular piston seals 30 are positioned one on either side of the piston bearing 29 and in channels in the piston provided therefor. The piston bearing 29 is modified in that it includes at least one annular flange 31 arranged to underlie at least one of the piston seals 30. Vent passageways 32 are positioned radially in the piston bearing 29 and communicate with secondary vent passageways 33 also positioned therein and extending outwardly into the flange 31 thereof so as to communicate with the space beneath the piston seals 30. Hydraulic pressure moving beneath the annular piston seals 30 will therefor be vented by the vent passageways 33 and 32 to the periphery of the piston bearing 29.

It will occur to those skilled in the art that while the construction in FIG. 3 shows but one annular flange 31 on the piston bearing 29, it could be formed with oppositely disposed annular flanges so that they underlie both of the channels in which both of the piston seals 30 are positioned as such modification would comprise a mere duplication of parts.

It will also occur to those skilled in the art that the piston bearing 29 and the flange 30 can be formed in two parts rather than integral as disclosed and wherein the flange 31 is separate from the annular piston bearing 29.

It will thus be seen that a vented piston bearing has been disclosed which is so arranged that it will prevent build up of hydraulic pressure beneath the annular piston seals lying adjacent thereto in a hydraulic piston and cylinder assembly and that it will by such venting action effectively prevent the extrusion of the piston seals from the piston as has heretofore been common in the art.

Although but three embodiments of the present invention have been illustrated and described, it will be apparent to those skilled in the art that various other changes and modifications may be made therein without departing from the spirit of the invention.

Having thus disclosed my invention, what I claim is:

1. A resilient piston bearing for a hydraulic piston and cylinder assembly including a cylinder, a piston, at least one piston seal seat and at least one resilient annular piston seal freely seated thereon, said piston bearing positioned on said piston abutting said piston seal with the periphery of said seal being slidably engaging said cylinder, vent passageways in said piston bearing communicating with the periphery of said piston bearing and the inner side portion thereof adjacent the seat of said piston seal, whereby fluid passing between said seal and seat is vented to the periphery of said piston bearing.

2. The piston bearing for hydraulic piston and cylinder assemblies set forth in claim 1 and wherein an annular groove is formed in the periphery of the piston bearing and some of the vent passageways communicate therewith.

3. The piston bearing set forth in claim 1 and wherein the vent passageways comprise shallow grooves in at least one side of the piston bearing arranged in radial pattern and spaced circumferentially with respect to one another.

4. The piston bearing set forth in claim 1 and wherein the vent passageways comprise several radially extending circumferentially spaced passageways formed in the piston bearing and several transversely extending circumferentially spaced passageways formed in the piston bearing and communicating with said radially extending passageways and the sides of said piston bearing.

5. The piston bearing set forth in claim 1 and wherein an annular shallow groove is formed in the peripheral surface of said piston bearing inwardly of the sides thereof and in communication with said vent passageways.

6. The piston bearing set forth in claim 4 and wherein an annular shallow groove is formed in the peripheral surface of said piston bearing and said radially extending passageways communicate therewith.

* * * * *